United States Patent
Hayama et al.

(10) Patent No.: US 8,744,687 B2
(45) Date of Patent: Jun. 3, 2014

(54) VEHICLE STEERING APPARATUS

(75) Inventors: Ryouhei Hayama, Nabari (JP); Tomoyasu Kada, Kaizuka (JP); Shingo Maeda, Kashiwara (JP); Shuuji Kimura, Kashihara (JP)

(73) Assignee: Jtekt Corporation, Osaka-shi (JP)

( * ) Notice: Subject to any disclaimer, the term of this patent is extended or adjusted under 35 U.S.C. 154(b) by 0 days.

(21) Appl. No.: 13/494,391

(22) Filed: Jun. 12, 2012

(65) Prior Publication Data

US 2012/0253603 A1    Oct. 4, 2012

Related U.S. Application Data

(62) Division of application No. 12/060,573, filed on Apr. 1, 2008, now Pat. No. 8,224,528.

(30) Foreign Application Priority Data

Apr. 2, 2007 (JP) ................................. 2007-096577

(51) Int. Cl.
  *B62D 6/08*    (2006.01)
(52) U.S. Cl.
  USPC .................. 701/42; 701/41; 701/70; 180/402; 180/6.2; 180/444; 180/446
(58) Field of Classification Search
  USPC .......... 701/41, 42, 70; 180/6.2, 402, 444, 446
  See application file for complete search history.

(56) References Cited

U.S. PATENT DOCUMENTS

| | | | |
|---|---|---|---|
| 6,138,788 A * | 10/2000 | Bohner et al. | 180/405 |
| 6,219,604 B1 * | 4/2001 | Dilger et al. | 701/41 |
| 6,343,671 B1 * | 2/2002 | Ackermann et al. | 180/444 |
| 6,408,687 B1 * | 6/2002 | Ashrafi et al. | 73/117.02 |
| 6,505,703 B2 * | 1/2003 | Stout et al. | 180/446 |
| 6,580,987 B2 * | 6/2003 | Sadano et al. | 701/41 |
| 6,651,771 B2 * | 11/2003 | Chabaan | 180/446 |
| 6,719,087 B2 * | 4/2004 | Demerly | 180/402 |
| 6,738,699 B2 * | 5/2004 | Yao et al. | 701/41 |
| 6,751,539 B2 * | 6/2004 | Uenuma et al. | 701/41 |
| 7,004,278 B2 * | 2/2006 | Sugitani et al. | 180/402 |

(Continued)

FOREIGN PATENT DOCUMENTS

| | | |
|---|---|---|
| EP | 1 593 582 A2 | 11/2005 |
| JP | 2-24270 | 1/1990 |

(Continued)

OTHER PUBLICATIONS

Office Action issued Oct. 6, 2011 in Japan Application No. 2007-096577 (with English Translation).

*Primary Examiner* — Helal A Algahaim
*Assistant Examiner* — Kelly E Darby
(74) *Attorney, Agent, or Firm* — Oblon, Spivak, McClelland, Maier & Neustadt, L.L.P.

(57) ABSTRACT

A vehicle steering apparatus in which a mechanical coupling between a steering member and steered wheels is uncoupled, includes a steering actuator for driving a steered mechanism and a control unit for drive-controlling the steering actuator. The control unit reduces steering-stiffness using a PID control portion for drive-controlling the steering actuator according to a deviation between a target steered angle and a steered-angle detected by the steered angle sensor. A gain setting portion sets gains of the PID control portion to be relatively low when a predetermined condition is satisfied.

4 Claims, 3 Drawing Sheets

(56) References Cited

U.S. PATENT DOCUMENTS

| | | |
|---|---|---|
| 7,092,805 B2 * | 8/2006 | Kasahara et al. ............... 701/41 |
| 7,239,972 B2 * | 7/2007 | Deville ........................... 702/94 |
| 7,315,772 B2 * | 1/2008 | Tsutsumi et al. ............... 701/41 |
| 7,520,365 B2 * | 4/2009 | Fukuba et al. ................. 180/402 |
| 7,734,406 B1 * | 6/2010 | Oppenheimer et al. ........ 701/70 |
| 7,798,279 B2 * | 9/2010 | Williams ....................... 180/402 |
| 2001/0048220 A1 * | 12/2001 | Lorenz ........................... 280/777 |
| 2003/0055545 A1 * | 3/2003 | Uenuma et al. ................ 701/41 |
| 2003/0141134 A1 * | 7/2003 | Sherwin et al. ............... 180/402 |
| 2004/0055810 A1 * | 3/2004 | Chabaan ........................ 180/446 |
| 2004/0200661 A1 * | 10/2004 | Sugitani et al. ............... 180/402 |
| 2005/0067214 A1 * | 3/2005 | Tanaka et al. ................. 180/446 |
| 2005/0072621 A1 * | 4/2005 | Hara et al. ..................... 180/444 |
| 2005/0103561 A1 * | 5/2005 | Endo et al. .................... 180/443 |
| 2005/0137772 A1 * | 6/2005 | Smakman et al. .............. 701/70 |
| 2005/0149241 A1 * | 7/2005 | Fujioka et al. ................. 701/41 |
| 2005/0284688 A1 * | 12/2005 | Deville .......................... 180/443 |
| 2006/0000662 A1 * | 1/2006 | Heilig et al. ................... 180/446 |
| 2006/0042858 A1 * | 3/2006 | Boyle et al. ................... 180/402 |
| 2006/0080016 A1 * | 4/2006 | Kasahara et al. ............... 701/41 |
| 2006/0086560 A1 * | 4/2006 | Furusho et al. ................ 180/446 |
| 2007/0039775 A1 * | 2/2007 | Matsuno et al. ............... 180/446 |
| 2007/0289805 A1 * | 12/2007 | Birsching et al. ............. 180/443 |
| 2008/0272580 A1 * | 11/2008 | Breed ............................ 280/735 |
| 2008/0289897 A1 * | 11/2008 | Williams ....................... 180/402 |

FOREIGN PATENT DOCUMENTS

| | | |
|---|---|---|
| JP | 10-258748 | 9/1998 |
| JP | 11-078935 | 3/1999 |
| JP | 2005-306364 | 11/2005 |
| JP | 2005-329751 | 12/2005 |
| JP | 2005-335613 | 12/2005 |
| JP | 2006-143074 | 6/2006 |
| JP | 2006-281927 | 10/2006 |

\* cited by examiner

VEHICLE STEERING APPARATUS

CROSS-REFERENCE TO RELATED APPLICATIONS

This application is a Divisional Application of U.S. patent application Ser. No. 12/060,573 filed on Apr. 1, 2008, the entire content of which is incorporated herein by reference, and claims the benefit of priority to Japanese Patent Application No. 2007-096577 filed on Apr. 2, 2007.

BACKGROUND OF THE INVENTION

The present invention relates to a vehicle steering apparatus for steering steered wheels according to an operation of a steering member.

In a so-called link type vehicle steering apparatus in which steering member is mechanically coupled to steered wheels, for example, a steering column and a rack housing are elastically supported using elastic support members such as a rubber bush.

In recent years, a so-called steer-by-wire (linkless) type steering apparatus has been proposed, in which a mechanical coupling between the steering member and the steered wheels is uncoupled and in which a part of a steering transmission system is constituted by an electric path.

In this kind of the steer-by-wire type steering apparatus, the vehicle steering apparatus in which a housing for supporting a steering ring shaft connected to a steering member is elastically supported. (see, e.g., JP-A-2005-306364).

Meanwhile, in a case where an elastic support structure having been used in a conventional link type vehicle steering apparatus is applied to a structure for supporting a steered mechanism of the steer-by-wire type vehicle steering apparatus, there is a fear of reduction in controllability of an actual steered angle. That is, there are fears that reproducibility of an actual steered angle with respect to a steering angle is reduced, and that a steering feeling is deteriorated.

SUMMARY OF THE INVENTION

The invention is accomplished in view of the aforementioned problems. An object of the invention is to provide a steer-by-wire type vehicle steering apparatus that is inexpensive and that has a good steering feeling.

The present inventors have considered that increase in the stiffness of a structure for supporting a steered mechanism in a steer-by-wire type vehicle steering apparatus enhances the reproducibility of a steered angle with respect to a steering angle given by a driver to a steering member and improves a steering feeling.

However, for example, in a case where the steered mechanism is rigidly supported, the steered mechanism directly receives a reverse input from a road surface. Thus, a side force received by the steered wheels is increased. Consequently, there are fears that the lateral slip-angle of the steered wheels is changed, that a change in vehicle behavior is increased, and that vehicle-body vibrations are generated.

The present inventors have considered that even in the case where the steered mechanism is rigidly supported, steering-stiffness can be reduced to an appropriate level by steering control.

The invention is accomplished according to such findings. According to the invention, there is provided a vehicle steering apparatus in which a mechanical coupling between a steering member (2) and steered wheels (3), is uncoupled. The vehicle steering apparatus is featured by comprising a steering actuator (4) for driving a steered mechanism (50), and a control unit (19) for drive-controlling the steering actuator. The vehicle steering apparatus is featured in that the control unit includes steering-stiffness reducing means (23, 25) for reducing steering-stiffness.

For example, the steering-stiffness reducing means of the control unit (in the case of an embodiment of the vehicle steering apparatus of the invention) can include a lowpass filter (23) configured to filter a steered angle detected by a steered angle sensor. The control unit can drive-control the steering actuator according to a deviation between a target steered angle ($\delta W^*$) and the detected steered-angle ($\delta W$) filtered by the lowpass filter.

In this case, a gain at a relatively high frequency corresponding to road surface vibrations can be reduced using the lowpass filter. Consequently, steering-stiffness can be reduced in response to a reverse input from a road surface. Moreover, a steering feeling can be improved. Further, it is unnecessary to use an elastic support structure used in the conventional steering apparatus as a structure for supporting the steered mechanism. Accordingly, the support structure can be simplified. Thus, the manufacturing cost of the steering apparatus can be reduced.

Alternatively, the control unit (in the case of an embodiment of the vehicle steering apparatus of the invention) can include a proportional integral differential (PID) control portion (25) that drive-controls the steering actuator according to a deviation between a target steered angle ($\delta W'$) and a steered-angle, which is detected by a steered angle sensor, or between the target steered angle and the steered angle, which is detected by the steered angle sensor and is filtered by the lowpass filter. The control unit can include also a gain setting portion (26) that sets, when a predetermined condition is satisfied, gains ($K_P$, $K_I$, $K_D$) of the PID control portion to be relatively low, and that serves as the steering-stiffness reducing means.

In this case, a steady-state deviation of the steered angle can relatively be increased by reducing, when the predetermined condition is met, the gains of the PID control portion. Consequently, depending upon a situation, the steering-stiffness can be reduced, and the steering feeling can be improved. Additionally, it is unnecessary to use an elastic support structure used in the conventional steering apparatus as a structure for supporting the steered mechanism. Accordingly, the support structure can be simplified. Thus, the manufacturing cost of the steering apparatus can be reduced.

It is sufficient to provide at least one of the lowpass filter and the gain setting portion for setting gains for PID control in the vehicle steering apparatus as the steering-stiffness reducing means.

The predetermined condition (in the case of an embodiment of the vehicle steering apparatus of the invention) includes at least one of conditions that a detected vehicle speed (V) is equal to or higher than a predetermined value, that a detected slip-angle ($\beta$) is equal to or larger than a predetermined value, and that a detected vertical acceleration (Gz) of a vehicle body (60) is equal to or higher than a predetermined value. In a case where the gains for PID control are set to be high during high-speed driving and snowy-road driving, the followability of an actual steered angle with respect to a steering angle input, which is implemented by a driver's operation, is increased. Accordingly, a vehicle behavior becomes irregular. Consequently, it becomes necessary that a driver iteratively performs a correction steering operation. Additionally, there is a fear that shock due to roughness of a road surface is excessively transmitted to a driver during rough-road driving. Thus, a driver can be provided with substantially appropriate ease of driving by reducing the gains for PID control depending upon a situation. Consequently, a steering feeling can be improved.

The vehicle steering apparatus of the invention (in the case of an embodiment thereof) can include a steered shaft (6), which axially moves s steered, and a housing (5) for supporting the steered shaft. This housing is rigidly coupled to the vehicle body. In this case, as a result of rigidly supporting the housing on the vehicle body, the support structure can substantially be simplified. Thus, the manufacturing cost of the vehicle steering apparatus can be reduced. Moreover, a favorable steering feeling can be achieved by the combination of the rigid support of the housing on the vehicle body and the reduction in the steering-stiffness.

In the foregoing description, reference numerals in parentheses designate associated components of embodiments that will be described later. However, the reference numerals in the parentheses have not been described for purposes of limitation of the scope of the invention.

DETAILED DESCRIPTION OF PREFERRED EMBODIMENTS

A preferred embodiment of the invention is described below with reference to the accompanying drawings.

Figure 1:
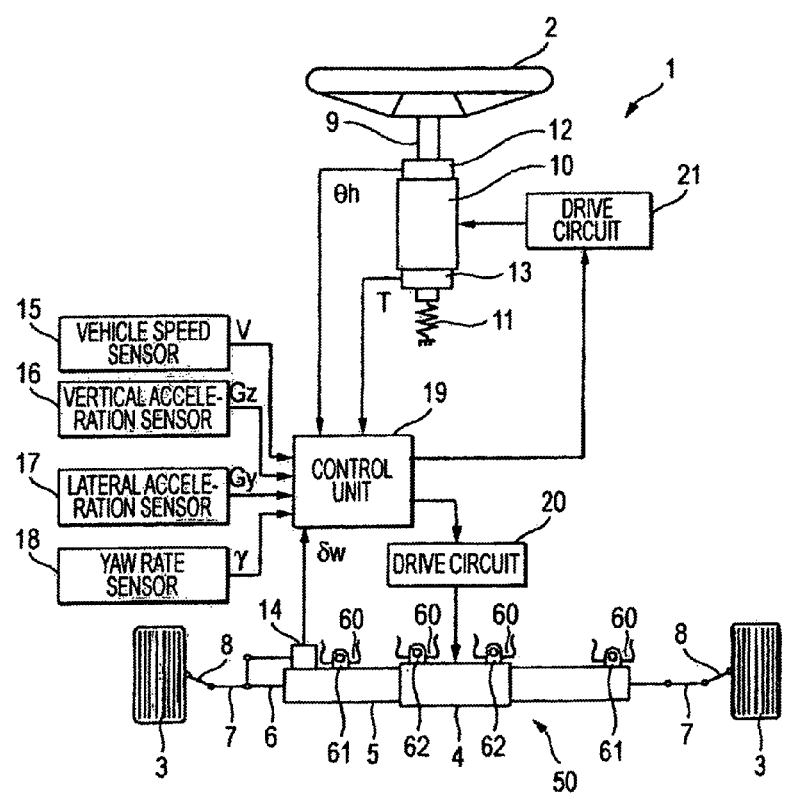
FIG. 1 is a schematic diagram illustrating a general configuration of a vehicle steering apparatus according to an embodiment of the invention.

FIG. 1 is a schematic diagram illustrating a general configuration of a vehicle steering apparatus according to an embodiment of the invention. Referring to FIG. 1, the vehicle steering apparatus 1 constitutes a so-called steer-by-wire system in which the mechanical connection between steering member 2, such as steering wheels, and steered wheels 3 is released.

An operation of a steering actuator 4 driven in response to a rotating operation of the steering member 2 is converted into a rectilinear motion in a vehicle-width direction of a steered shaft 6 supported on the housing 5. Then, the rectilinear motion of the steered shaft 6 is converted into a steered motion of the left-side and right-side steered wheels 3 for steering. Thus, steering is achieved.

The steering actuator 4 includes an electric motor, such as a brushless motor. A drive force (torque of an output shaft) of the steering actuator 4 is converted into a rectilinear motion in an axial direction (vehicle-width direction) of the steered shaft 6 by a motion conversion mechanism (e.g., a ball screw mechanism) provided in relation to the steered shaft 6. The rectilinear motion of the steered shaft 6 is transmitted to tie-rods 7 provided so as to be respectively project from both ends of the steered shaft 6, thereby turning each of knuckle arms 8 is caused. Consequently, the steering of the steered wheels 3 supported by the knuckle arms 8 is achieved. The steered shaft 6, the tie-rods 7, the knuckle arms 8 and the line constitute a steered mechanism 50 for steering the steered wheels 3.

The housing 5 for supporting the steered shaft 6, and a housing of the steering actuator 4 are rigidly fixed to a vehicle body 60 with fixation screws through metal brackets 61 and 62. That is, these housings are rigidly coupled to the vehicle body 60. Thus, a conventionally used elastic structure including a rubber bush, a steering damper, and a tie-rod with a damper is omitted.

The steering member 2 is coupled to a rotary shaft 9 rotatably supported on the vehicle body. A reaction-force actuator 10 for providing an operation reaction force to the steering member 2 is annexed to the rotary shaft 9. The reaction-force actuator 10 includes an electric motor, such as a brushless motor, having an output shaft formed integrally with the rotary shaft 9.

An elastic member 11 including, e.g., a spiral spring is connected between the vehicle body and an end portion of the rotary shaft 9, which is opposite to the steering member 2. When the reaction force actuator 10 applies no torque to the steering member 2, the elastic member 11 causes the steering member 2 with an elastic force thereof to return to a straight steering position.

A steering angle sensor 12 for detecting a steering angle Oh of the steering member 2 is provided in relation to the rotary shaft 9 to detect an operation input value for the steering member 2. A torque sensor 13 for detecting steering torque T applied to the steering member 2 is provided on the rotary shaft 9. On the other hand, a steered angle sensor 14 for detecting a steered angle $\delta_W$ (tire angle) of the steered wheels 3 is provided in relation to the steered shaft 6.

In addition to these sensors, the vehicle steering apparatus according to the present embodiment is provided with a vehicle speed sensor 15 for detecting a vehicle speed V, a vertical acceleration sensor 16 serving as a rough road condition detecting sensor for detecting a vertical acceleration $G_Z$ of the vehicle body 60, a lateral acceleration sensor 17 for detecting a lateral acceleration Gy of a vehicle, and a yaw rate sensor 18 for detecting a yaw rate γ of the vehicle.

Detection signals output from the sensors 12 to 18 are input to a control unit 19 serving as a vehicle control means, which includes an electronic control unit (ECU) containing a microcomputer.

The control unit 19 sets a target steered angle $\delta_W^*$ according to the steering angle θh, which is detected by the steering angle sensor 12, and to the vehicle speed V detected by the, vehicle speed sensor 15. The control unit 19 drive-controls the steering actuator 4 through a drive circuit 20 according to a deviation between the target steered angle $\delta_w^*$ and a filtered steered-angle $\delta_W'$ obtained by filtering (processing) the steered angle $\delta_W$ (hereunder referred to as a detected steered-angle $\delta_W$) detected by the steered angle sensor 14.

On the other hand, the control unit 19 controls the reaction force actuator 10 (i.e., performs reaction force control) through a drive circuit 21 according to detection signals output by the sensors 12 to 18 so that an appropriate reaction force acting in a direction opposite to a steering direction of the steering member 2 is generated.

Figure 2:
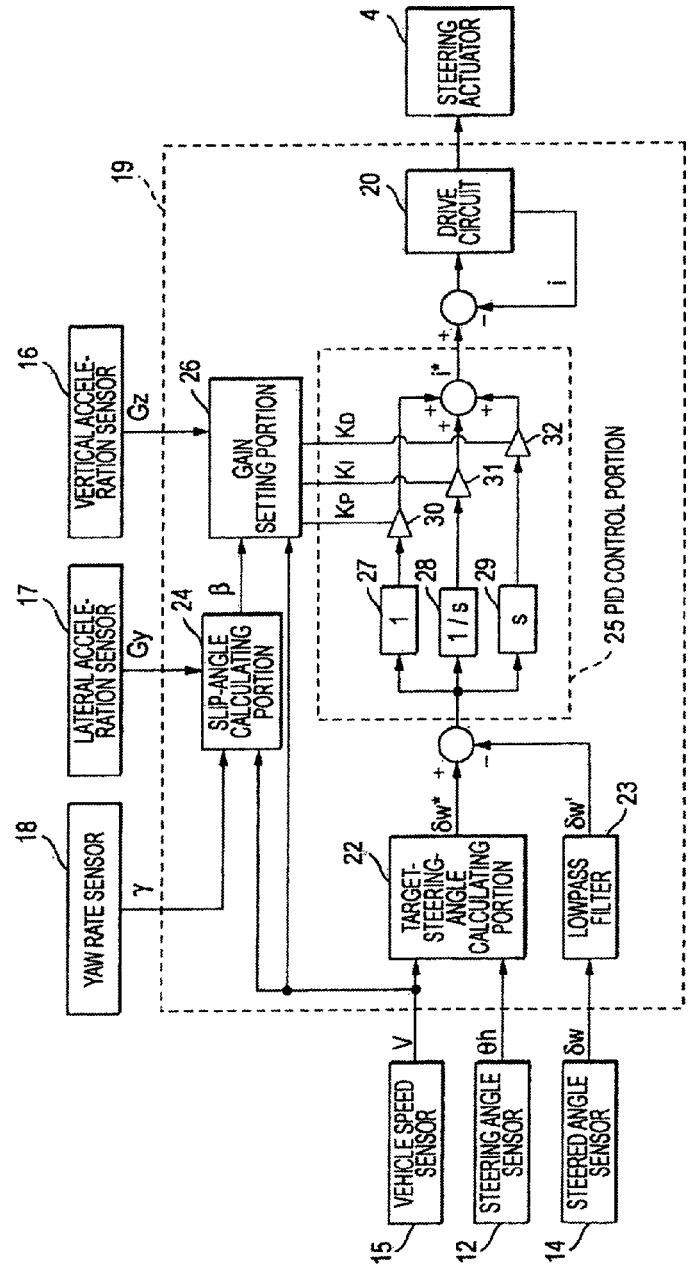
FIG. 2 is a block diagram illustrating a steering control section of a control unit according to the invention.

FIG. 2 is a block diagram illustrating a section relating to steering force control. The control unit 19 includes a target steered angle calculating unit 22 for calculating a target steered angle $\delta_W^*$, a lowpass filter 23 serving as a steering-stiffness reducing means for filtering a detected steered-angle $\delta_W$, a slip-angle calculating portion 24 for calculating a slip-angle β, a PID control portion 25 for setting a target current i* of an electric motor serving as a steering actuator 4, and a gain setting portion 26 serving as the steering-stiffness reducing means for setting the gains $K_P$, $K_I$, and $K_D$, which will be described later, for the PID control portion 25.

The steering angle Oh detected by the steering angle sensor 12 and the vehicle speed V detected by the vehicle speed sensor 15 are input to the target steered angle calculating portion 22. Then, the target steered angle calculating portion 22 calculates the target steered angle $\delta_W^*$ according to the input steering angle Oh and the input vehicle speed V, and outputs the calculated target steered angle $\delta_W^*$.

Figure 3:
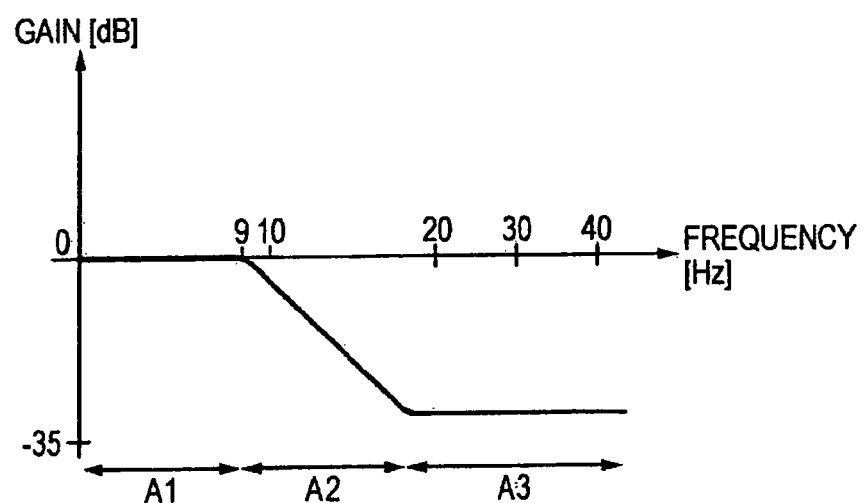
FIG. 3 is a graph illustrating a frequency characteristic (frequency-cutoff characteristic) of a lowpass filter.

On the other hand, the detected steered-angle $\delta_W$ detected by the steered angle sensor 14 is input to the lowpass filter 23. Then, the lowpass filter 23 filters the detected steered-angle $\delta_W$ and outputs the filtered steered-angle $\delta_W'$. The frequency characteristic (cut-off characteristic) of the lowpass filter 23 is similar to that of an integration circuit, as illustrated in, e.g., FIG. 3. That is, the gain is set to be high in a low-frequency region A1 (0 to 9 Hz), while the gain is set to be low in a high-frequency region A3 (18 Hz or more). Thus, a reverse input component from a road surface is substantially cut off. In an intermediate frequency region A2 (9 to 18 Hz), the gain is gradually decreased as the frequency is increased.

The PID control portion 25 includes a proportion processing portion 27, an integration processing portion 28, a differential processing portion 29, a proportional gain multiplication portion 30, an integral gain multiplication portion 31, and a differential gain multiplication portion 32. A deviation $(\delta_W^* - \delta_W')$ between the target steered angle $\delta_W^*$ output from the target steered angle calculating portion 22 and the filtered steered-angle $\delta_W'$ output from the lowpass filter 23 is input to the PID control portion 25.

In the proportional gain multiplication portion 30, a value obtained by performing proportion processing on the aforementioned deviation $(\delta_w^* - \delta_W')$ at the proportion processing portion 27 is multiplied by a proportional gain $K_P$ given from the gain setting portion 26. In the integral gain multiplication portion 31, a value obtained by performing integral processing on the aforementioned deviation $(\delta_w^* - \delta_W')$ at the integration processing portion 28 is multiplied by a integral gain $K_I$ given from the gain setting portion 26. In the differential gain multiplication portion 32, a value obtained by performing differential processing on the aforementioned deviation $(\delta_w^* - \delta_W')$ at the differential processing portion 29 is multiplied by a differential gain $K_D$ given from the gain setting portion 26.

The PID control portion 25 obtains a target current i* of the electric motor serving as the steering actuator 4 by adding up results (corresponding to proportional compensation, integral compensation, and differential compensation, respectively) of multiplications respectively performed at the proportional gain multiplication portion 30, the integral gain multiplication portion 31, and the differential gain multiplication portion 32. Then, the PID control portion 25 outputs the obtained value of the target current i*.

A deviation between the value of the target current i* and the value of a current i flowing through the electric motor serving as the steering actuator 4 is input to the drive circuit 20. The drive circuit 20 performs, e.g., pulse-width modulation (PWM) control of the electric motor serving as the steering actuator 4 according to this deviation input thereto.

As described above, the proportional gain $K_P$ multiplied by the proportional gain multiplication portion 30, the integral gain $K_I$ multiplied by the integral gain multiplication portion 31, and the differential gain $K_D$ multiplied by the differential gain multiplication portion 32 are given by the gain setting portion 26 serving as the steering-stiffness reducing means for reducing steering-stiffness. The gain setting portion 26 sets each of the proportional gain $K_P$, the integral gain KI, and the differential gain $K_D$ at a relatively low value when predetermined condition is satisfied. Instead of setting all of the proportional gain $K_P$, the integral gain $K_I$, and the differential gain $K_D$ at a relatively low value, one or two of the proportional gain $K_P$, the integral gain $K_I$, and the differential gain $K_D$ can be set by the gain setting portion 26 at a low value.

More specifically, the lateral acceleration $G_y$ detected by the lateral acceleration sensor 17, the yaw rate $\gamma$ detected by the yaw rate sensor 18, and the vehicle speed V detected by the vehicle speed sensor 15 are input to the slip-angle calculating portion 24. Then, the slip-angle calculating portion 24 calculates a slip-angle $\beta$ of the vehicle according to the input lateral acceleration $G_y$, the input yaw rate $\gamma$, and the input vehicle speed V and outputs this to the gain setting portion 26.

The slip-angle $\beta$ of the vehicle can be calculated using integral calculation based on, e.g., the following equation (1).

$$\beta = .\mathrm{intg.}(G_y/V - \gamma)dt \qquad (1).$$

In the aforementioned example, the slip-angle $\beta$ of the vehicle is calculated according to the aforementioned equation (1). However, the slip-angle $\beta$ of the vehicle can be calculated using first-order time lag pseudo-integration calculation, instead of the aforementioned integral calculation. Alternatively, the slip-angle $\beta$ of the vehicle can actually be measured.

The vehicle speed V detected by the vehicle speed sensor 15, the slip-angle $\beta$ of the vehicle, which is output from the slip-angle calculating portion 24, and the vertical acceleration $G_Z$ detected by the vertical acceleration sensor 16 are input to the gain setting portion 26.

The gain setting portion 26 sets each of the proportional gain $K_P$, the integral gain $K_I$, and the differential gain $K_D$ at a relatively low value when such data input to the gain setting portion 26 satisfy at least one of conditions that the detected vehicle speed V is equal to or higher than a predetermined value V1 (e.g., 60 km/h) (V≤V1), that the detected slip-angle $\beta$ is equal to or larger than a predetermined value $\beta1$ (e.g., 2°) ($\beta \geq \beta1$), and that the detected vertical acceleration $G_Z$ is equal to or higher than a predetermined value $G_{Z1}$ (e.g., 1.5 g ("g" is a gravitational acceleration)).

The present embodiment employs a structure (rigid support structure) configured to rigidly fix the housing 5 for the steered shaft 6 and the housing for the steering actuator 4 to the vehicle body 60 as a structure supporting the steering mechanism 50. Therefore, it is unnecessary to use the conventional elastic support structure, such as rubber bush. Consequently, the present embodiment of the invention has advantages that the support structure can be simplified, and that accordingly, the manufacturing cost of the apparatus can be reduced. More particularly, although it is necessary in the case of the conventional support structure to select a rubber bush or the like suitable for each type of vehicle, the present embodiment can save the effort of selecting such a rubber bush or the like. Additionally, the present embodiment has another advantage that the support structure can be shared among different types of vehicle.

However, in a case where the housing 5 is rigidly supported as described above, the steering-stiffness becomes too high if the PID control is not adjusted in view of the situation. Thus, there are the following fears. That is, in a case where the gains for PID control are set to be high during high-speed driving or snowy-road driving, the followability of an actual steered angle with respect to a steering angle input, which is implemented by a driver's operation, is too high. Accordingly, a vehicle behavior becomes irregular. Consequently, it becomes necessary that a driver iteratively performs a correction steering operation. Additionally, shock due to the unevenness of a road surface is excessively transmitted to a driver during rough-road driving. In these cases, a steering feeling is deteriorated.

Thus, according to the present embodiment employing the rigid support structure for the steered mechanism 50, the gains $K_P$, $K_I$, and $K_D$ for PID control are reduced depending upon a situation (e.g., the detected value of the vehicle speed, the slip-angle, or the vertical acceleration). Consequently, the steady-state deviation of the steered angle is relatively increased. That is, a driver can be provided with substantially appropriate play of driving by reducing the steering-stiffness depending upon a situation. Consequently, a steering feeling can be improved.

Further, according to the present embodiment, a gain at a relatively high frequency corresponding to road surface vibrations can be reduced using the lowpass filter 23. Consequently, steering-stiffness in response to a reverse input from a road surface can be reduced. Moreover, a steering feeling can be improved.

It is sufficient to provide at least one of the lowpass filter 23 and the gain setting portion 26 for the PID control as the steering-stiffness reducing means.

Incidentally, the steering-stiffness reducing means according to the invention may be combined with the structure in which the housing 5 for the steered shaft 6 and the housing for the steering actuator 4 are elastically supported. For example, the housing 5 is supported by an elastic support structure similar to the rigid support structure. Then, the steering-stiffness can be adjusted using a lowpass filter serving as the steering-stiffness reducing means. Various other modifications can be effected within the scope of the invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

What is claimed is:

1. A vehicle steering apparatus in which a mechanical coupling between a steering member and steered wheels is uncoupled, the apparatus comprising:
    a steering actuator for driving a steered mechanism, and
    a control unit for drive-controlling the steering actuator, wherein the control unit includes steering-stiffness reducing means for reducing steering-stiffness, including a proportional integral differential control portion for drive-controlling the steering actuator according to a deviation between a target steered angle and a steered-angle detected by a steered angle sensor, and the steering-stiffness reducing means includes a gain setting portion for setting gains of the proportional integral differential control portion to be relatively low when a detected vertical acceleration of a body of the vehicle is equal to or higher than a predetermined value.

2. The vehicle steering apparatus according to claim 1, wherein the predetermined condition further includes at least one of conditions that a detected vehicle speed is equal to or higher than a predetermined value, and that a detected slip-angle is equal to or larger than a predetermined value.

3. The vehicle steering apparatus according to claim 1 further comprising:
    a steered shaft configured to axially move as steered; and
    a housing for supporting said steered shaft, the housing being rigidly coupled to a vehicle body.

4. The vehicle steering apparatus according to claim 1 further comprising a vertical acceleration sensor for detecting a vertical acceleration of the body of the vehicle, wherein the vertical acceleration sensor outputs a vertical acceleration signal to the gain setting portion.

\* \* \* \* \*